Oct. 28, 1958     E. C. MILLER ET AL     2,857,799
DIFFERENTIAL REFRACTOMETER

Filed Jan. 2, 1952     4 Sheets-Sheet 1

FIG. 1.

INVENTORS.
E. C. MILLER
B. J. SIMMONS
BY
*Hudson & Young*
ATTORNEYS

Oct. 28, 1958    E. C. MILLER ET AL    2,857,799
DIFFERENTIAL REFRACTOMETER
Filed Jan. 2, 1952    4 Sheets-Sheet 3

INVENTORS.
E. C. MILLER
B. J. SIMMONS
BY
Hudson & Young
ATTORNEYS

Oct. 28, 1958

E. C. MILLER ET AL 2,857,799

DIFFERENTIAL REFRACTOMETER

Filed Jan. 2, 1952

INVENTORS.
E.C. MILLER
B.J. SIMMONS
BY
*Hudson & Young*
ATTORNEYS

United States Patent Office 2,857,799
Patented Oct. 28, 1958

2,857,799

DIFFERENTIAL REFRACTOMETER

Elmer C. Miller and Bill J. Simmons, Bartlesville, Okla., assignors to Phillips Petroleum Company, a corporation of Delaware Application January 2, 1952, Serial No. 264,458

13 Claims. (Cl. 88—14)

This invention relates to means for analyzing fluid streams. In another aspect it relates to an improved differential refractometer.

It is well known practice to control various types of industrial processes by an analysis of a sample stream removed from some point in the process, and by adjustment of a selected process variable in response to variations of a given property of the sample stream. One particular system of analysis that has been proposed in this regard is that of measuring the refractive index of the sample stream in comparison with a standard material. By comparing the refractive index of such a sample with a second standard material, any variance in composition of the sample stream can be employed to actuate suitable control apparatus to adjust a selected process variable whereby the composition of the sample stream is returned to the desired value. In addition to the field of process control, measurement of the refractive index of a material finds many other practical applications. For example, the determination of molecular weights by light scattering requires a measurement of refractive index accurate to at least the fifth decimal place.

Although refractometers presently are known in the art which possess the desired degree of sensitivity, these instruments for the most part are quite complicated, being of the laboratory type, and further, require the services of a skilled operator. One such instrument is the Rayleigh differential refractometer which is based upon the concept of visual matching of interference fringes. This of course is a tedious method of analysis which depends in accuracy upon the skill of the person conducting the measurements, thereby making such an instrument subjective as to its mode of operation.

It is the purpose of the present invention, however, to provide a relatively simple and rugged instrument capable of detecting differences in refractive indexes between two fluids under consideration, which instrument is objective as to its mode of operation, and which is capable of providing extremely accurate measurements. The optical system of this refractometer includes a source of light, a slit and lens combination for collimating a narrow beam of said light, a refractometer cell for deflecting the light beam by an amount proportional to the difference in refractive indexes of the two fluids contained therein, a rotatable dual mirror assembly for reflecting the light beam emerging from said cell to a dual radiation detector unit, electrical servomechanism actuated by light impinging upon said detector unit to rotate the mirror assembly until the light beam is focused at a predetermined position on the detector unit, and means for indicating the degree of rotation of the mirror assembly. Means also are provided for establishing a close degree of control over the temperature and pressure of the fluids entering the refractometer in order that fluctuations thereof do not adversely affect the accuracy of the measurements.

It is contemplated that the indicated difference in refractive indexes provided by the apparatus of this invention can be employed in many automatic control operations, such as, for example, to control a fractionating column in a refinery by adjustment of the heat supplied to the column, the reflux ratio, or the feed rate; it being apparent that the apparatus of this invention is useful either for indicating or control purposes wherever variations in the composition of a sample stream produce variations in the refractive index thereof.

Accordingly, it is an object of this invention to provide an improved continuous analyzing device utilizing the principle of differential refraction.

Another object is to provide a differential refractometer having an improved optical arrangement.

A further object is to provide a differential refractometer having improved temperature and pressure control means.

A still further object is to provide apparatus to accomplish the above mentioned objects which is of simplified, compact, rugged construction.

Various other objects, advantages, and features of this invention should become apparent from the following description taken in conjunction with the accompanying drawing in which:

Figure 1 is a schematic view of the overall differential refractometer of this invention;

Figure 2:
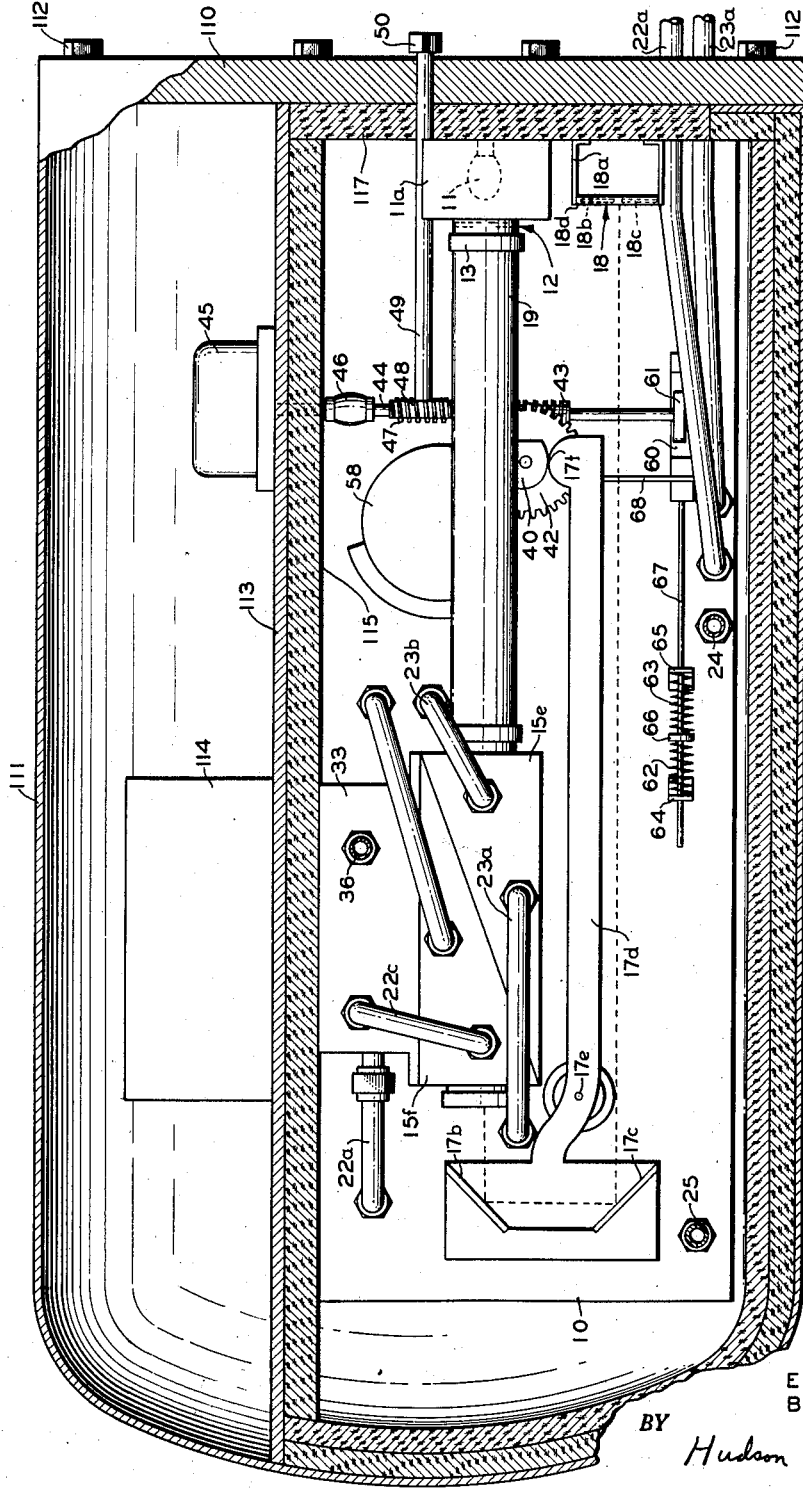
Figure 2 is a detailed plan view of the differential refractometer of Figure 1.

Referring now to Figures 1 and 2 the differential refractometer includes a base 10 upon which is supported a source of radiation 11. Light from source 11 is directed through a narrow slit 12, lens 13, and lens 14 to a refractometer cell 15, in which the beam is deviated by an amount proportional to the difference in refractive indexes of the two fluids contained therein. The light beam emerging from cell 15 passes through a lens 16, and is reflected by a rotatable mirror assembly 17 to a dual or twin radiation detector unit 18. Mirror assembly 17 is rotated in response to the radiation impinging upon detector 18 in a manner such that the light strikes a preselected portion of said unit 18 at all times. The degree of rotation of mirror assembly 17 necessary to so position the light beam on unit 18 is a measure of the difference in refractive indexes of the two fluids contained within cell 15.

In one particular embodiment of this invention light source 11 is an ordinary incandescent bulb which produces light having wave lengths in the visible spectrum. Source 11 is mounted within a housing 11a, the latter being secured to front plate 110. Light emitted from source 11 is directed through a slit 12 defined by opaque plates 12a and 12b having sharp edges opposing one another, and then through a convex lens 13 which is positioned adjacent slit 12 at a distance from source 11 such that the focal point of lens 13 is at a point between slit 12 and source 11. A tubular housing 19 is disposed between lens 13 and cell 15 so that light from source 11 passes therethrough.

The refractometer cell 15 is illustrated in detail in

Figure 3:
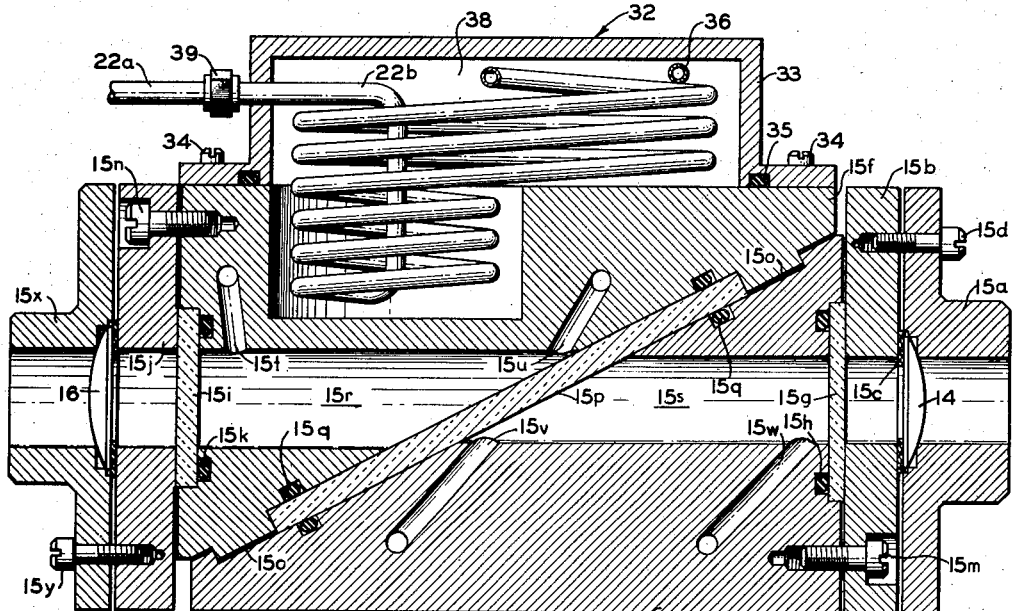
Figure 3 is a detailed view of the refractometer cell together with the accompanying temperature regulating means.

Figure 3. A second convex lens 14 is mounted between a collar 15a and an annular member 15b, which in turn are held together by suitable screws, one of which is shown at 15d. Slit 12 is at the focal point of lens 14. The beam of light passes through housing 19 which serves to prevent stray radiation from source 11 out of detector 18. The light beam then passes through baffle 15c into cell assembly 15. Cell 15 is formed from two complementary metal blocks 15e and 15f which define an interior passage closed at one end by a transparent window 15g mounted between block 15e and annular member 15b, this window 15g being provided with a sealing gasket 15h to prevent leakage of fluids from the interior of the cell unit. The opposite end of the interior cell passage is closed by a similar window 15i mounted between block 15f and a second annular member 15j, this window 15i being provided with a similar sealing gasket 15k. Annular member 15b is secured to block 15e by a plurality of screws, one of which is shown at 15m; and in like manner annular member 15j is secured to block 15f by a plurality of screws, one of which is shown at 15n. Blocks 15e and 15f have interfitting portions 15o such that when assembled a rigid unitary structure is provided. A third convex lens 16 is mounted between collar 15x and annular member 15j, the latter being joined by suitable screws, one of which is shown at 15y.

A diagonal transverse plate 15p of transparent material is mounted between blocks 15e and 15f and provided with sealing gaskets 15q. Plate 15p thus serves to divide the interior passage of cell 15 into two fluid tight chambers 15r and 15s. Chamber 15r is provided with an inlet opening 15t and an outlet opening 15u, and chamber 15s is provided with an inlet opening 15v and an outlet opening 15w.

In one particular application of this differential refractometer a sample fluid is circulated continuously through chamber 15r, while chamber 15s is filled with a static standard comparison fluid; however, it should be apparent that in place of the standard comparison fluid remaining static in chamber 15s, a second sample fluid can be circulated continuously therethrough. Light entering cell 15 through collar 15a is collimated by lens 14 and passes as a narrow beam through window 15g and plate 15p, whereupon the beam leaves cell through window 15i and lens 16. The emerging light beam strikes mirror assembly 17 and is reflected to detector unit 18. If the refractive indexes of the fluids in the two cell chambers are identical, the beam leaves cell 15 in an axial path; however, if the refractive indexes of the fluids differ, then the beam is deviated from its axial path by an amount proportional to the difference between the refractive indexes of the two fluids. The amount of this light beam deviation provides a continuous indication of the difference in the refractive indexes of two fluids being compared.

The rotatable mirror assembly 17 includes a frame 17a which mounts plane mirrors 17b and 17c in optical alignment such that the planes of the surfaces of said mirrors are at right angles, although such alignment is not essential for satisfactory results. Frame 17a is provided with an extended integral arm 17d pivotally mounted on base 10 by a vertical shaft 17e which is positioned on a line bisecting the right angle formed by the intersection of the planes of the surfaces of mirrors 17b and 17c. The end of arm 17d opposite the mirror assembly is provided with a rounded portion 17f which makes slidable contact with a rotatable cam 40 in a manner described in greater detail hereinafter.

The dual radiation detector unit 18 includes a bracket 18a secured to base 10. When visible light is employed for purposes of analysis, detector unit 18 preferably includes two photovoltaic cells 18b and 18c mounted within an insulating sleeve 18d, which in turn is secured to bracket 18a. Cells 18b and 18c are disposed symmetrically with respect to the beam of radiation reflected thereon from mirror assembly 17, such that said reflected beam normally impinges between the two cells. If infrared radiation is employed for the analysis, cells 18b and 18c can be replaced by bolometers, thermistors or other suitable infrared detectors; while if other frequencies of radiation are employed, suitable detectors therefor are provided.

As previously indicated the position of mirror assembly 17 is regulated by means of rotatable cam 40. Cam 40 is attached to a vertical shaft 41 which is journaled in base 10 and which carries a worm gear 42 meshing with a worm 43 carried on a horizontal shaft 44. Shaft 44 is rotated by means of a reversible electric motor 45 mounted on suitable heat insulating blocks, not shown, on the side of vertical plate 113, said shaft 44 and motor 45 being coupled by means of a flexible connecting device 46. Shaft 44 also carries a second worm 47 which meshes with a worm gear 48 mounted on a horizontal shaft 49. An indicating pointer 50 attached to the end of shaft 49 is provided with a dial 51 calibrated to measure differences in refractive indexes of the fluids under consideration.

A second spur gear 55 also is carried by cam shaft 41 so as to mesh with a spur gear 56 which rotates the vertical shaft 57 of a telemetering potentiometer unit 58.

Figure 5:
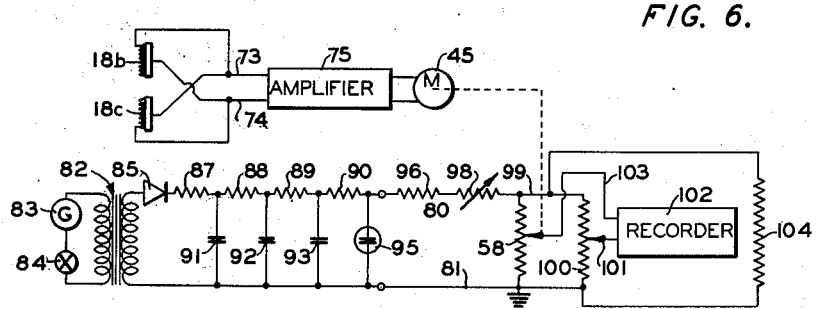
Figure 5 is a schematic view of the electrical circuit of the refractometer.

As illustrated in Figure 5 the radiation detector cells 18b and 18c are connected in opposition by means of electrical leads 73 and 74 so as to produce a resultant voltage proportional to the difference in total radiation impinging upon the two detector cells. The voltage appearing between leads 73 and 74 is amplified by a unit 75, the output of which is fed to reversible motor 45, said motor being mechanically coupled as previously described through shaft 44, worm 43, gear 42, shaft 41, gears 55 and 56, and shaft 57 to potentiometer 58.

In order to obtain accurate readings with this refractometer it is extremely important that close control of the temperature and pressure of the two fluids under comparison be maintained. Even slight temperature or pressure differentials between the two fluids can result in serious error when attempting to obtain results accurate to at least the fifth decimal place.

Figure 4:
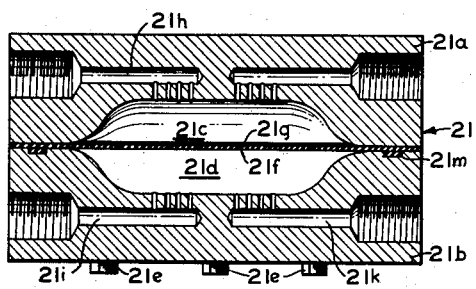
Figure 4 is a detailed view of the pressure equalizing device employed with the refractometer.

To regulate the pressure of the two fluids being compared, that is to maintain equal pressures within chambers 15r and 15a, there is provided a pressure equalizer unit 21 attached to the under side of base 10 and illustrated in greater detail in Figure 4. Pressure equalizer 21 comprises two circular metal plates 21a and 21b having cavities 21c and 21d formed in the respective opposing faces. Plates 21a and 21b are secured to one another by means of bolts such as 21e. A thin flexible diaphragm 21f, preferably formed of neoprene, and having a coating of Teflon (polymerized tetrafluoro ethylene) 21g on the upper side thereof, is disposed between plates 21a and 21b thereby dividing cavities 21c and 21d into two pressure chambers of approximately equal volume. A circular sealing gasket 21m is positioned between diaphragm 21f and plate 21b. Plates 21a and 21b are provided with openings 21h and 21i, respectively, which serve to connect chambers 21c and 21d with inlet fluid conduits 23b and 22c, respectively. Plates 21a and 21b also are provided with second openings 21j and 21k, respectively, which serve to connect chambers 21c and 21d with outlet fluid conduits 23c and 22d, respectively. The purpose of providing the Teflon coating 21g to the upper side of diaphragm 21f which faces the standard comparison fluid is to prevent any possible contamination of the standard fluid by the material of the diaphragm. In the illustrated embodiment of this invention it is contemplated that the standard fluid not be circulated through the cell and pressure equalizer, but rather remain static therein at all times. The fluid being tested, however, is vented after passing through the pressure equalizer so that there is no danger of error even though the fluid may react somewhat with the material of the diaphragm.

A conduit 23b is provided to connect outlet opening 15w of cell chamber 15s directly with inlet opening 21h of pressure equalizer 21. In similar manner a second conduit 22c serves to connect outlet opening 15u of cell chamber 15r directly with inlet opening 21i of pressure equalizer 21. Thus chambers 15s and 21c are in direct communication as are chambers 15r and 21d. Accordingly it should be apparent that the position of diaphragm 21f depends upon the pressures of the standard and test fluids contained within chambers 21c and 21d, respectively. If there is any pressure differential between the two chambers diaphragm will be displaced until the change in volume between the two chambers results in equal pressures. Since only small variation in pressure ordinarily is experienced between the two fluids being compared, the illustrated pressure equalizer functions in a very efficient manner. Pressure equalizer 21 does not form a part of the present invention per se, but rather is the supject of the copending application of B. J. Simmons, Serial No. 264,515, filed January 2, 1952, entitled Fluid Pressure Equalizer, now Patent No. 2,736,332.

Temperature control of cell 15 is effected by constructing blocks 15e and 15f of a metal for good heat conducting properties, and further by constructing the blocks sufficiently massive to serve as a heat reservoir thermally connecting chambers 15r and 15s with one another and with metal base 10. In this regard it should be pointed out that an increase or decrease in the temperature of the cell as a whole does not materially affect the deflection of the light beam passing therethrough; however, even a small temperature differential between the fluids in the two cell chambers may result in error. Thus, the illustrated construction of cell unit 15, while not eliminating temperature variation of the unit as a whole, provides sufficient heat transfer that the fluids in the two cell chambers remain at substantially the same temperature.

A closer degree of control over the temperature of the sample fluid circulated through chamber 15r is provided by passing said sample fluid through a conduit 22a which is disposed in a sinuous path beneath base 10 of the analyzer unit. A metal pan 26 is attached to the lower side of base 10 thereby enclosing conduit 22a. Openings 24 and 25 are provided in base 10 whereby water or other fluid can either be added to or circulated through pan 26. A second conduit 23 also is disposed within pan 26 in similar manner to enable the standard or second test fluid to be circulated therethrough if desired.

It should be evident that even relatively large variations in temperature of the fluids entering the analyzer unit are eliminated by the heat exchange conduits 22a and 23a disposed within pan 26. However, a still closer degree of control is provided by means of a second heat exchange system in the form of a reservoir 32 disposed adjacent block 15f of cell 15. A metal housing 33 is secured to block 15f by means of screws such as 34 and sealing gaskets 35. An opening 36 is provided in housing 33 so that the interior chamber 38 can be filled with water or other fluid. A conduit 22b, which is connected to conduit 22a by coupling 39, is disposed in a sinuous path within the chamber 38 formed in part by the region between block 15f and housing 33 and in part by an adjacent cavity in block 15f. As a result of these various heat equalization means the two fluids under consideration remain at substantially equal temperatures at all times, which contributes materially to the accuracy of the analysis performed by this instrument.

In the operation of the differential refractometer thus far described mirror assembly 17 and detector unit 18 are adjusted initially with respect to one another such that the deflected light beam strikes the central portion of unit 18 between the detector cells 18b and 18c when there is a desired relationship between the refractive indexes of the fluids in chambers 15r and 15s of cell unit 15. Ordinarily, this relationship is provided when the refractive indexes of the two fluids are equal. Under such condition the output voltage of the detector unit 18 is zero resulting in no current being fed to motor 45. Assuming, for example, that the refractive index of the fluid in chamber 15r varies to shift the radiation beam in a direction such that more radiation impinges upon detector 18b than upon detector 18c, a voltage of a first polarity then is produced between leads 73 and 74 by the interaction of the radiation detectors 18b and 18c. This voltage is amplified by unit 75 and applied to motor 45. The output rotation of motor 45, in turn, is applied through the associated mechanical linkage described above so as to rotate mirror housing arm 17d in a clockwise direction about pivot point 17e, thereby producing a shift in deflection of the beam back to the initial position between detector cells 18b and 18c. This clockwise rotation continues until the radiation striking the two detector cells is equally divided, at which time rotation of motor 45 is stopped. The extent of rotation of motor 45 is thus proportional to the deviation of the refractive index of the fluid in chamber 15r from its original or standard value, and this deviation is indicated both by the position of the wiper of potentiometer 58 and by pointer 50 on dial 51. Should the refractive index of the fluid in chamber 15r vary in opposite manner so as to shift the radiation beam in the other direction thereby resulting in more radiation impinging upon detector 18c than upon detector 18b, a voltage of second polarity is produced between leads 73 and 74. This second voltage rotates motor 45 in opposite direction to impart a counterclockwise rotation to arm 17d. Again this rotation continues until the total radiation striking the two detector cells 18b and 18c is equal.

The possible degree of rotation of mirror assembly 17 by cam 40 is limited by a slidable frame 60 which rests upon base 10. A cam 61 carried on the end of motor shaft 44 is free to rotate within frame 60 as long as said frame is positioned centrally, within selected limits, with respect to cam 61. Frame 60 normally is maintained in a symmetrical position with respect to cam 61 by means of compression springs 62 and 63 disposed between guide supports 64 and 65, respectively, and a common central flanged portion 66 of rod 67, the end of said rod 67 being attached to frame 60 at one end. Frame 60 further is provided with an integral arm 68 which engages a cam stop member 69 carried on shaft 41. As long as the light beam reflected from mirror assembly 17 is deviated such that arm end 17f rests upon the curved portion of cam 40, the position of cam stop member 69, as determined by the rotation of shafts 44 and 41 by motor 45, is such that frame 60 remains disposed with respect to cam 61 so as to allow free rotation of said cam 61 within frame 60. However, when the light beam is deviated to either side such that arm end 17f engages the flat portion of cam 40, cam stop member 69 engages arm 68 thereby displacing frame 60 into contact with rotating cam 61. This prevents further rotation of shafts 44 and 41, which in turn prevents the indicating means from going beyond the calibrated scales.

Figure 7:
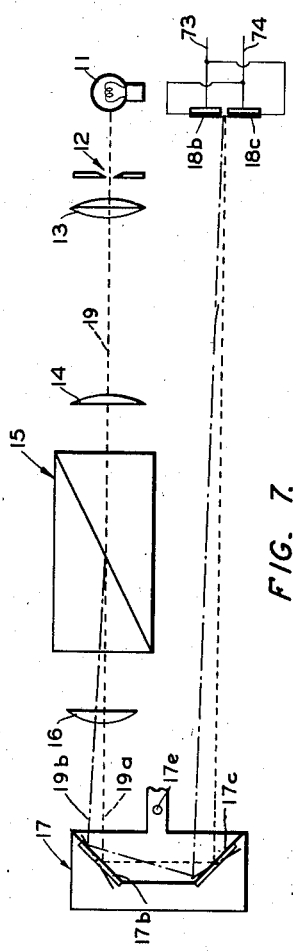
Fig. 7 is a schematic view of the optical path of the refractometer.
Figure 8:
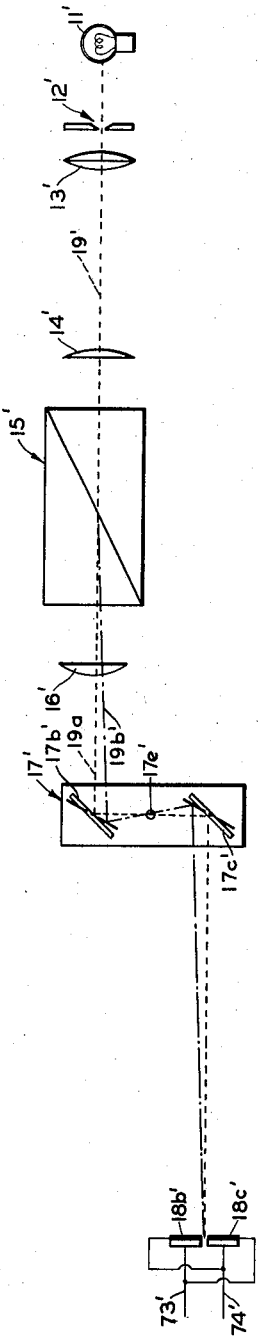
Figure 8 is a schematic view of a modified optical path.

The optical system of this invention is represented schematically in Figure 7. Lens 13 is focused at a point between the filament of light source 11 and slit 12 to provide maximum light through cell unit 15, and light from slit 12 is collimated by lens 14 such that light from said slit 12 is transmitted through cell 15 as parallel rays. Unit 18 is positioned at the focal point of lens 16 which results in an image of narrow slit 12 being projected upon the radiation detectors 18b and 18c. As long as the refractive indexes of the two fluids in chambers 15r and 15s are equal light beam 19a emerges in the same path from cell 15 as entering beam 19 and is reflected by mirror assembly 17 to the space between detectors 18b and 18c. If the refractive indexes of the two fluids vary such as to deviate the emerging beam 19b upward from cell 15, for example, then mirror assembly is rotated clockwise about pivot point 17e until light beam 19c is returned to the space between detectors 18b and 18c. In Figure 8 there is illustrated a modified form of the optical system wherein mirrors 17b' and 17c' are mounted in parallel planes facing one another with the pivot point 17e' being centered therebetween. If the light beam 19c' emerging from cell 15' is deviated downward, mirror assembly 17' must be rotated counterclockwise in order to restore the beam position to the space between detectors 18b' and 18c'.

The electrical circuit associated with this refractometer is illustrated in Figure 5. A source of alternating current 83 is connected in circuit with the primary winding of a transformer 82 and a switch 84. The secondary winding of transformer 82 is connected in circuit with a rectifier 85, filter impedances 87, 88, 89 and 90, filter capacitors 91, 92 and 93, and a voltage regulator tube 95. The positive terminal of this power supply circuit is connected to a lead 80 through a resistor 96 of high ohmic value such that practically constant current is maintained through said lead 80. Lead 80, in turn, is connected through a variable resistor 98 to a lead 99 which is connected to one end terminal of potentiometer 58. The negative terminal of the power supply circuit is connected to a grounded lead 81, which in turn is connected to the other end terminal of potentiometer 58. A second potentiometer 100 and a calibrating resistor 104 are connected between leads 81 and 99 thereby shunting potentiometer 58. The contactor of potentiometer 100 is connected through a lead 101 to a recorder 102, and the contactor of potentiometer 58 is connected to recorder 102 through a lead 103. In operation, the initial zero adjustment of recorder 102 is made by positioning the contactor of potentiometer 100. The position of the contactor of potentiometer 58 is determined by the rotation of motor 45 through the mechanical connecting linkage above described. Accordingly, the potential applied to recorder 102 is a measure of the rotation of motor 45, which in turn is a measure of the difference in refractive indexes of the two fluids under consideration.

Figure 6:
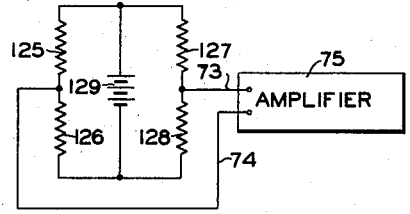
Figure 6 is a schematic view of a modified electrical circuit.

In Figure 6 there is illustrated a modification of the circuit of Figure 5 wherein photoconductive cells are substituted for the photovoltaic cells 18b and 18c. These photoconductive cells, represented by resistors 125 and 126, are connected in a Wheatstone bridge circuit with balancing resistors 127 and 128. A battery 129 is connected across a first pair of opposite terminals of the bridge and output leads 73 and 74 are connected across the second pair of opposite terminals of the bridge. This circuit is particularly suitable for use with infrared radiation, wherein the cells 125 and 126 can be bolometers, thermistors, or the like; the only requirement being that said cells 125 and 126 vary in ohmic resistance in accordance with changes in radiation incident thereon. The circuit of Figure 6 also is suitable for use with photoemissive cells wherein a treated cathode mounted in a glass envelope emits electrons when radiation impinges thereon, these electrons being collected at the anode. Such tubes may be either gas filled or vacuum type. It is to be understood, therefore, that the resistance elements 125 and 126 in Figure 6 may represent either photoemissive cells or photoconductive cells, as above described.

The overall arrangement of parts of the preferred embodiment of this refractometer is illustrated in Figures 1 and 2. In order to reduce the hazard of explosion often present in refining operations, for example, the entire instrument is enclosed within an explosion-proof housing which takes the form of a metal front plate 110 and a cylindrically shaped tank 111 secured to front plate 110 by bolts such as 112. A second flat metal plate 113 is disposed vertically within tank 112 thereby separating motor 45 and housing 114, which contains the circuit components of Figure 5, from the remainder of the elements of the refractometer. The optical system is still further thermally insulated by a layer of cork or other insulating material 115 positioned adjacent plate 113, and a layer of insulating material 117 positioned adjacent the inner side of plate 110.

While certain preferred embodiments of this invention have been described for illustrative purposes, the invention obviously is not limited thereto.

Having described our invention, we claim:

1. An analyzer comprising, in combination, a radiation source to establish a beam of radiation, first and second radiation detectors mounted adjacent one another, means for deflecting said beam of radiation in accordance with the refractive index of a test material, reflector means comprising first and second reflectors mounted in fixed relation to one another, said reflector means being rotatable about a fixed axis whereby said beam of radiation is reflected by said reflectors toward said detectors, means for comparing the quantity of radiation incident upon said first and second detectors, means actuated by said comparing means to rotate said reflector means about said axis until a predetermined relationship exists between the quantity of radiation incident upon said first and second detectors, and means to measure the rotation of said reflectors.

2. The combination in accordance with claim 1 wherein said first and second rotatable reflectors comprise first and second plane reflectors having the planes of their surfaces perpendicular to one another.

3. The combination in accordance with claim 1 wherein said first and second rotatable reflectors comprise first and second plane reflectors having the planes of their surfaces parallel to one another.

4. An analyzer comprising, in combination, a radiation source to establish a beam of radiation, first and second radiation detectors mounted adjacent one another, a refractometer cell unit for refracting said beam in accordance with the difference in refractive indices between two fluids disposed in adjacent sections thereof, reflector means comprising first and second reflectors mounted in fixed relation to one another, said reflector means being rotatable about a fixed axis whereby said beam of radiation is reflected by said reflectors toward said detectors, means for comparing the quantity of radiation incident upon said first and second detectors, means actuated by said comparing means to rotate said reflector means about said axis until a predetermined relationship exists between the quantity of radiation incident upon said first and second detectors, and means to measure the rotation of said reflectors.

5. The combination in accordance with claim 4 wherein said refractometer cell comprises two right angle hollow prisms symmetrically positioned apex to base, one prism adapted to contain a first fluid, and the second prism adapted to contain a second fluid the refractive index of which is to be compared with the refractive index of said first fluid.

6. The combination in accordance with claim 5 wherein the radiation source produces visible light and the detectors are photoelectric cells.

7. An analyzer comprising, in combination, a radiation source, first and second radiation detectors mounted adjacent one another, means for collimating a narrow beam of radiation from said source, a refractometer cell unit for refracting said beam in accordance with the difference in refractive indices of two fluids disposed in adjacent sections thereof, means for reflecting said beam to direct said beam between said first and second detectors, said reflecting means including first and second reflectors positioned at right angles with one another and adapted to be rotated about a common axis on a line bisecting the angle between said reflectors, means responsive to said radiation beam striking either of said detectors for rotating said reflectors until said beam is again directed between said detectors, and means for indicating rotation of said reflectors.

8. The combination in accordance with claim 7 further comprising a thermally insulated container enclosing said analyzer, one or more fluid filled tanks having conduits disposed therein through which the fluids being compared can be circulated, and means for equalizing the pressures of the two fluids to be compared.

9. The combination in accordance with claim 7 further comprising a thermally insulated container enclosing said analyzer, a first fluid tank having first and second conduits disposed therein through which the fluids to be compared can be circulated, a second fluid filled tank in heat exchange relationship with said refractometer cell, said second tank having a conduit disposed therein through which one of said fluids can be circulated, and means for equalizing the pressures of the two fluids to be compared.

10. An analyzer comprising, in combination, a radiation source, first and second radiation detectors mounted adjacent one another, means for collimating a narrow beam of radiation from said source, a refractometer cell unit for refracting said beam in accordance with the difference in refractive indices of two fluids disposed in adjacent sections thereof, means for reflecting said beam to direct said beam between said first and second detectors, said reflecting means including first and second reflectors positioned at right angles with one another and adapted to be rotated about a common axis on a line bisecting the angle between said reflectors, means for producing voltages representative of radiation striking said detectors, a motor driven by said voltages to rotate said reflectors until said beam is directed between said detectors, and means to indicate rotation of said reflectors.

11. The combination in accordance with claim 10 wherein said rotation indicating means comprises a rotatable pointer driven by said motor and a telemetering potentiometer also driven by said motor.

12. The combination in accordance with claim 11 further including means for limiting rotation of said motor beyond preselected limits.

13. An analyzer comprising, in combination, a radiation source, first and second radiation detectors mounted adjacent one another, means for collimating a narrow beam of radiation from said source, a refractometer cell unit for refracting said beam in accordance with the difference in refractive indices of two fluids disposed in adjacent sections thereof, means for reflecting said beam to direct said beam toward said detectors, said reflecting means including first and second reflectors positioned at right angles with one another and adapted to be rotated about a common axis on a line bisecting the angle between said reflectors, means for comparing the quantity of radiation incident upon said first and second detectors, means actuated by said comparing means to rotate said reflector means about said axis until a predetermined relationship exists between the quantity of radiation incident upon said first and second detectors, and means to measure the rotation of said reflectors.

References Cited in the file of this patent

UNITED STATES PATENTS

| | | |
|---|---|---|
| 454,989 | Sonden | June 30, 1891 |
| 830,225 | Haber | Sept. 4, 1906 |
| 1,264,374 | De Florez | Apr. 30, 1918 |
| 1,736,682 | Tuckerman | Nov. 19, 1929 |
| 1,923,891 | Skaupy | Aug. 22, 1933 |
| 2,427,996 | Seaman | Sept. 23, 1947 |
| 2,445,044 | Stamm et al. | July 13, 1948 |
| 2,483,102 | Pierson | Sept. 27, 1949 |
| 2,571,937 | Peck | Oct. 16, 1951 |
| 2,612,814 | Glasser | Oct. 7, 1952 |
| 2,624,014 | Barstow | Dec. 30, 1952 |
| 2,630,042 | Sheffer et al. | Mar. 3, 1953 |
| 2,686,454 | Ruska | Aug. 17, 1954 |